(12) United States Patent
Grabe et al.

(10) Patent No.: US 12,275,430 B2
(45) Date of Patent: *Apr. 15, 2025

(54) IDENTIFICATION OF PROXY CALIBRATION TARGETS FOR A FLEET OF VEHICLES

(71) Applicant: Waymo LLC, Mountain View, CA (US)

(72) Inventors: Volker Grabe, Mountain View, CA (US); Colin Braley, Mountain View, CA (US); Volodymyr Ivanchenko, Mountain View, CA (US); Alexander Meade, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/437,476

(22) Filed: Feb. 9, 2024

(65) Prior Publication Data

US 2024/0182065 A1    Jun. 6, 2024

Related U.S. Application Data

(63) Continuation of application No. 18/193,199, filed on Mar. 30, 2023, now Pat. No. 11,945,467, which is a
(Continued)

(51) Int. Cl.
*B60W 60/00*     (2020.01)
*B62D 15/02*     (2006.01)
(Continued)

(52) U.S. Cl.
CPC ......... *B60W 60/001* (2020.02); *B62D 15/021* (2013.01); *G01C 21/3415* (2013.01);
(Continued)

(58) Field of Classification Search
CPC .. B60W 60/001; H04W 4/46; G01C 21/3415; G08G 1/20
See application file for complete search history.

(56) References Cited

U.S. PATENT DOCUMENTS 6,505,105 B2   1/2003  Allen et al.
8,751,147 B2   6/2014  Colwell
(Continued)

FOREIGN PATENT DOCUMENTS

CN   109154647 A   1/2019
CN   106254461 B   4/2019
(Continued)

OTHER PUBLICATIONS

Hajri et al., "Automatic generation of ground truth for the evaluation of obstacle detection and tracking techniques", 7 pages.
(Continued)

*Primary Examiner* — Tan Q Nguyen
(74) *Attorney, Agent, or Firm* — MCDONNELL BOEHNEN HULBERT & BERGHOFF LLP

(57) ABSTRACT

Example embodiments relate to identification of proxy calibration targets for a fleet of sensors. An example method includes collecting, using a sensor coupled to a vehicle, data about one or more objects within an environment of the vehicle. The sensor has been calibrated using a ground-truth calibration target. The method also includes identifying, based on the collected data, at least one candidate object, from among the one or more objects, to be used as a proxy calibration target for other sensors coupled to vehicles within a fleet of vehicles. Further, the method includes providing, by the vehicle, data about the candidate object for use by one or more vehicles within the fleet of vehicles.

20 Claims, 10 Drawing Sheets

Related U.S. Application Data continuation of application No. 17/138,083, filed on Dec. 30, 2020, now Pat. No. 11,634,153.

(60) Provisional application No. 62/955,300, filed on Dec. 30, 2019.

(51) Int. Cl.
| | | |
|---|---|---|
| *G01C 21/34* | (2006.01) | |
| *G06V 20/56* | (2022.01) | |
| *G08G 1/00* | (2006.01) | |
| *H04W 4/46* | (2018.01) | |

(52) U.S. Cl.
CPC ............ *G06V 20/588* (2022.01); *G08G 1/20* (2013.01); *H04W 4/46* (2018.02); *B60W 2420/408* (2024.01); *B60W 2554/4049* (2020.02)

(56) References Cited

U.S. PATENT DOCUMENTS

| | | | |
|---|---|---|---|
| 8,775,064 | B2 | 7/2014 | Zeng et al. |
| 8,918,302 | B2 | 12/2014 | Hukkeri et al. |
| 9,297,899 | B2 | 3/2016 | Newman et al. |
| 9,478,079 | B2 | 10/2016 | Lenhardt et al. |
| 9,841,839 | B2 | 12/2017 | Leigh et al. |
| 9,933,515 | B2 | 4/2018 | Prokhorov |
| 10,430,970 | B2 | 10/2019 | Bier |
| 10,481,044 | B2 | 11/2019 | Sun et al. |
| 11,634,153 | B2 | 4/2023 | Grabe et al. |
| 11,945,467 | B2 | 4/2024 | Grabe et al. |
| 2010/0235129 | A1 | 9/2010 | Sharma et al. |
| 2014/0293225 | A1 | 10/2014 | Parto et al. |
| 2015/0185027 | A1 | 7/2015 | Kikkeri et al. |
| 2016/0210775 | A1 | 7/2016 | Alaniz et al. |
| 2017/0023945 | A1 | 1/2017 | Cavalcanti et al. |
| 2017/0072967 | A1 | 3/2017 | Fendt et al. |
| 2017/0309171 | A1 | 10/2017 | Zhao et al. |
| 2018/0190046 | A1 | 7/2018 | Levinson et al. |
| 2018/0276910 | A1 | 9/2018 | Pitt et al. |
| 2018/0329423 | A1 | 11/2018 | Zhu et al. |
| 2019/0056484 | A1 | 2/2019 | Bradley et al. |
| 2019/0073545 | A1 | 3/2019 | Dolgov et al. |
| 2019/0082173 | A1 | 3/2019 | Schilling |
| 2019/0086914 | A1 | 3/2019 | Yen et al. |
| 2019/0204425 | A1 | 7/2019 | Abari et al. |
| 2019/0204427 | A1 | 7/2019 | Abari et al. |
| 2021/0049901 | A1 | 2/2021 | Young et al. |
| 2021/0061306 | A1* | 3/2021 | Dagan ..................... H04W 4/40 |
| 2023/0027622 | A1* | 1/2023 | Haeusler .................. G01S 7/497 |
| 2023/0088398 | A1* | 3/2023 | Br?hlmeier ........... G01S 17/931 356/4.01 |
| 2023/0401745 | A1* | 12/2023 | Kothari ..................... G06T 7/70 |

FOREIGN PATENT DOCUMENTS

| | | |
|---|---|---|
| CN | 109839132 A | 6/2019 |
| CN | 110228431 A | 9/2019 |
| CN | 110514785 A | 11/2019 |
| DE | 102017006260 A1 | 1/2018 |
| IN | 201631024455 A | 1/2016 |
| KR | 1020160082309 A | 7/2016 |
| TW | 625051 B | 5/2018 |
| WO | 2014068302 A1 | 5/2014 |
| WO | 2017189361 A1 | 11/2017 |
| WO | 2019180325 A1 | 9/2019 |
| WO | 2019195363 A1 | 10/2019 |

OTHER PUBLICATIONS

International Search Report and Written Opinion dated Apr. 26, 2021 issued in connection with International Patent Application No. PCT/US2020/066860.

\* cited by examiner

IDENTIFICATION OF PROXY CALIBRATION TARGETS FOR A FLEET OF VEHICLES

CROSS-REFERENCE TO RELATED APPLICATIONS

This application is a continuation of U.S. patent application Ser. No. 18/193,199, filed Mar. 30, 2023, which is a continuation of U.S. patent application Ser. No. 17/138,083, filed Dec. 30, 2020, which claims priority to and is a non-provisional filing of U.S. Provisional Patent Application No. 62/955,300, filed on Dec. 30, 2019. The foregoing applications are incorporated herein by reference.

BACKGROUND

Unless otherwise indicated herein, the materials described in this section are not prior art to the claims in this application and are not admitted to be prior art by inclusion in this section.

Autonomous vehicles or vehicles operating in an autonomous mode may use information provided by sensors. Each of the vehicles may include a computing device to process information received from vehicle sensors to avoid obstacles and ensure proper navigation. Such vehicles are typically equipped with various types of sensors in order to detect objects in the environment. For example, an autonomous vehicle may include lasers, sonar, radar, cameras, and other sensors which scan and record data from the surroundings of the vehicle. Sensor data from one or more of these sensors may be used to detect objects and their respective characteristics (position, shape, heading, speed, etc.). This detection and identification is useful for the operation of autonomous vehicles.

In order to accurately detect the environment surrounding the vehicle, the vehicle sensors may require calibration. Calibration of the vehicle sensors may be performed by capturing data of calibration targets positioned at known distances relative to the sensors, capturing data of calibration targets having known reflectivity patterns, and/or capturing data of calibration targets having predetermined symbols in predetermined arrangements. Such calibration targets may be referred to herein as "ground-truth calibration targets."

Using the captured data generated from the sensors observing the ground-truth calibration targets, modifications may be made in hardware and/or software to account for discrepancies between the known calibration targets and the data measured using the sensors. Such ground-truth calibration techniques may take place at pre-specified temporal intervals (e.g., calibration may be performed every day, every week, every month, etc. for a particular sensor). Further, such calibration techniques may be performed in the location that houses the calibration equipment. For example, a specific garage may have multiple arrangements of calibration targets used to calibrate the different sensors of a vehicle.

After calibration, the vehicle may operate one or more of the recently calibrated sensors in run-time to perform object detection and avoidance. However, over time, the quality of the calibration of the sensors may degrade (e.g., because of mechanical shifts that arise within the optics of a sensor due to heat or jostling caused by uneven road surfaces). In order to correct for such degraded calibration, check-up or follow-up calibrations may be performed. Because only certain locations may house the equipment to perform ground-truth calibrations (e.g., using the ground-truth calibration targets), it may be onerous for the vehicle to perform such check-up or follow-up calibrations (e.g., it may be a long distance back to the calibration garage and/or only a certain number of vehicles can use the calibration garage at a time, thereby resulting in a long wait time for calibration during which the vehicle cannot be in use).

SUMMARY

The present application discloses embodiments that relate to apparatus and methods for detecting objects in the environment and identifying one or more candidate objects from the detected objects for use as proxy calibration targets to perform calibrations. The one or more candidate objects may be used as calibration targets to verify, validate, test, and/or calibrate sensors of vehicles. For example, vehicles may include one or more sensors (e.g., lidar sensors, radar sensors, sonar sensors, cameras, etc.) configured to capture portions of the environment surrounding the vehicle. Each of the vehicles may include a computing device configured to detect objects (e.g., buildings, walls, features, landmarks, stationary objects, validation or calibration targets, etc.) within the environment of the vehicle and identify one or more candidate objects from the detected objects for use as proxy calibration targets. The vehicles may be configured to send the information associated with the one or more candidate objects to a remote device (e.g., a remote server or another vehicle) for use in calibrating vehicle sensors.

A vehicle may be configured to receive the information associated with the one or more candidate objects from the remote device (e.g., a remote server). The vehicle may be configured to obtain the location of the one or more candidate objects from the received information and navigate to the location. Once the vehicle is near the one or more candidate objects, the vehicle can scan and/or capture the one or more candidate objects using the sensors of the vehicle. The vehicles may then compare the captured information associated with the one or more candidate objects with the information received from the remote device about the one or more candidate objects. The vehicle can be configured to use the comparison for calibrating, aligning, repairing, testing, validating, and/or verifying the performance of the sensors of the vehicle.

In one aspect, a method is provided. The method includes collecting, using a sensor coupled to a vehicle, data about one or more objects within an environment of the vehicle. The sensor has been calibrated using a ground-truth calibration target. The method also includes identifying, based on the collected data, at least one candidate object, from among the one or more objects, to be used as a proxy calibration target for other sensors coupled to vehicles within a fleet of vehicles. Further, the method includes providing, by the vehicle, data about the candidate object for use by one or more vehicles within the fleet of vehicles.

In another aspect, a method is provided. The method includes receiving, by a first vehicle within a fleet of vehicles, data about a proxy calibration target. The proxy calibration target has been characterized using a second sensor coupled to a second vehicle within the fleet of vehicles. The second sensor has been calibrated using a ground-truth calibration target. The proxy calibration target has also been identified, from among one or more objects, by the second sensor, as a candidate target for proxy calibration. The method also includes calibrating the first sensor using the data about the proxy calibration target.

In an additional aspect, a method is provided. The method includes receiving, by a proxy calibration target server, data about a candidate object within an environment. The data about the candidate object is usable by a fleet of vehicles to perform proxy calibrations. The data about the candidate object has been determined by a first sensor coupled to a first vehicle within the fleet of vehicles. The first sensor has been calibrated using a ground-truth calibration target. The candidate object has been identified, by the first sensor, from among one or more objects for use as a proxy calibration target. The method also includes providing, by the proxy calibration target server, the data about the candidate object to one or more vehicles within the fleet of vehicles.

These as well as other aspects, advantages, and alternatives will become apparent to those of ordinary skill in the art by reading the following detailed description, with reference, where appropriate, to the accompanying drawings.

DETAILED DESCRIPTION

Figure 1:
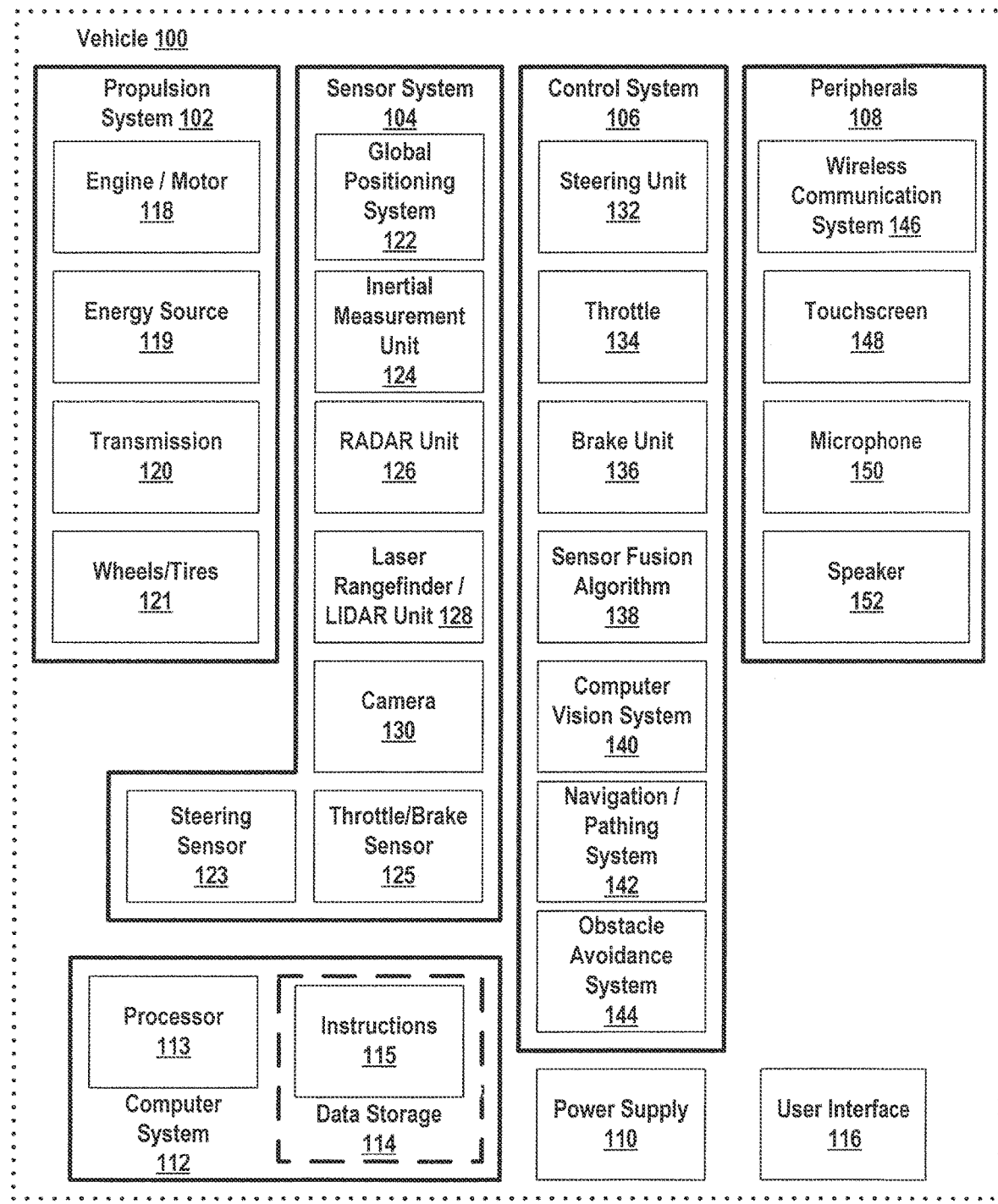
FIG. 1 is a functional block diagram illustrating a vehicle, according to an example embodiment.
Figure 2A:
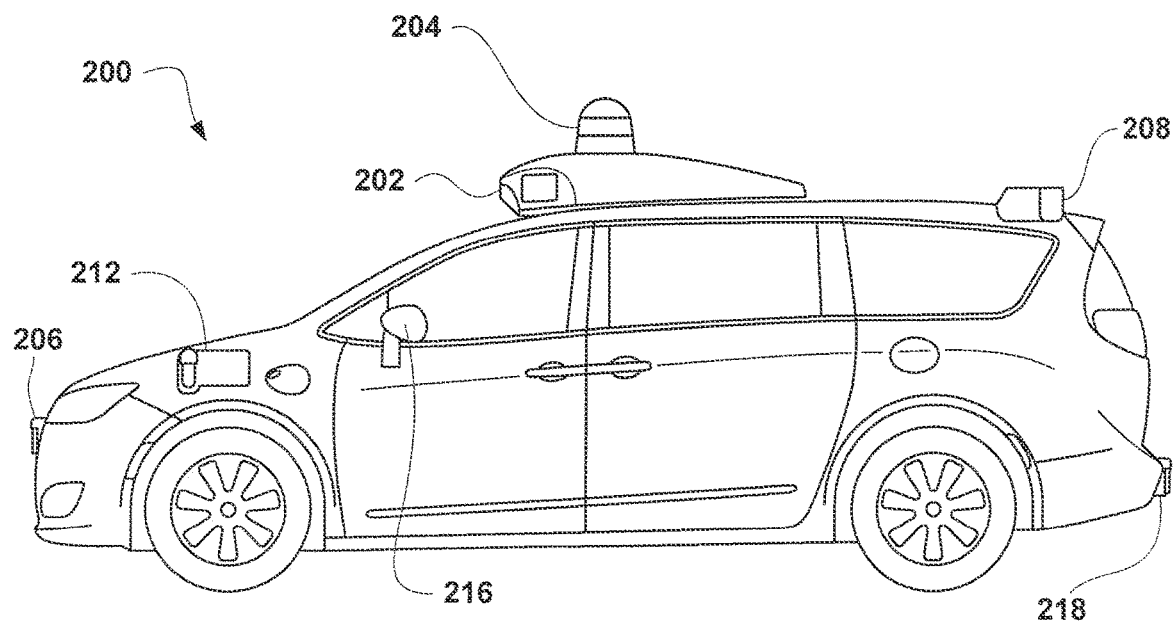
FIG. 2A is an illustration of a physical configuration of a vehicle, according to an example embodiment.
Figure 2B:
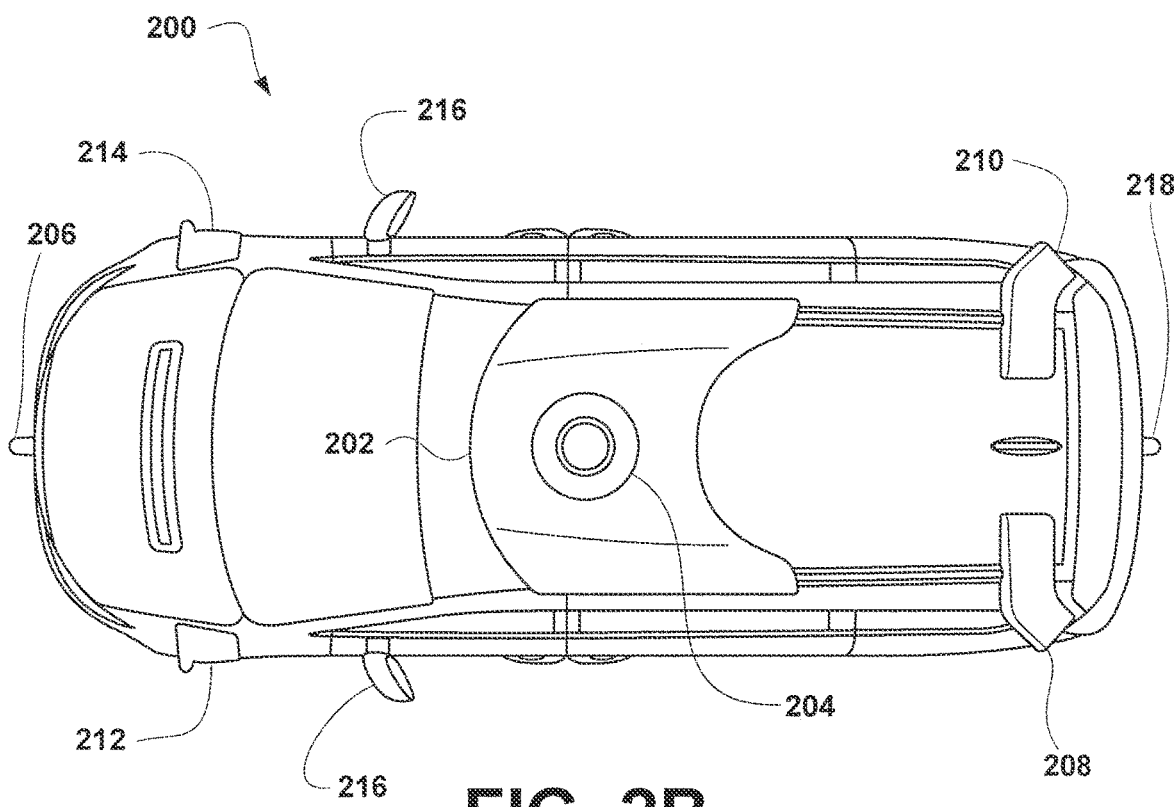
FIG. 2B is an illustration of a physical configuration of a vehicle, according to an example embodiment.
Figure 2C:
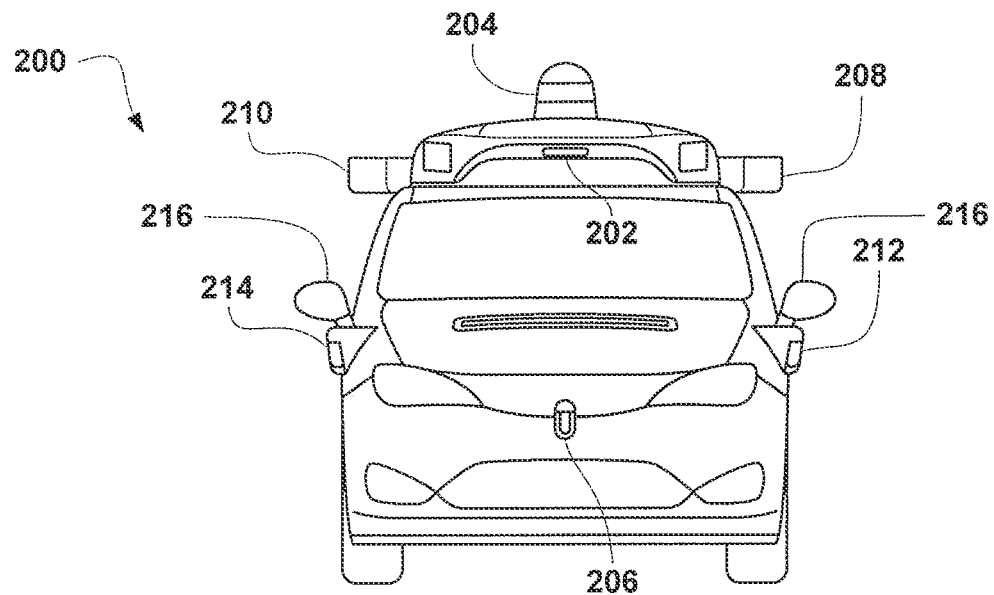
FIG. 2C is an illustration of a physical configuration of a vehicle, according to an example embodiment.
Figure 2D:
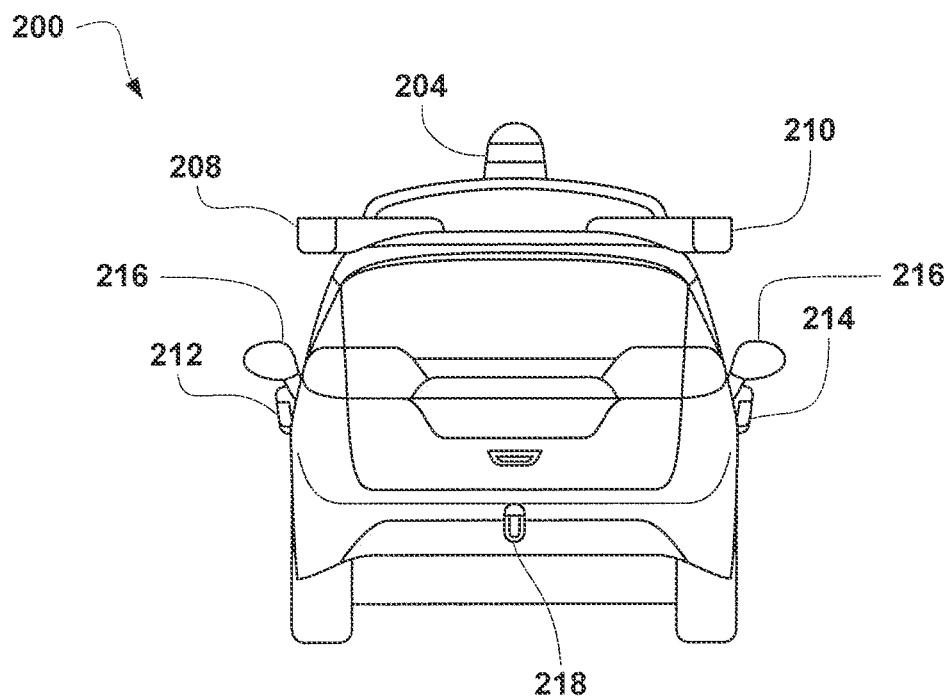
FIG. 2D is an illustration of a physical configuration of a vehicle, according to an example embodiment.
Figure 2E:
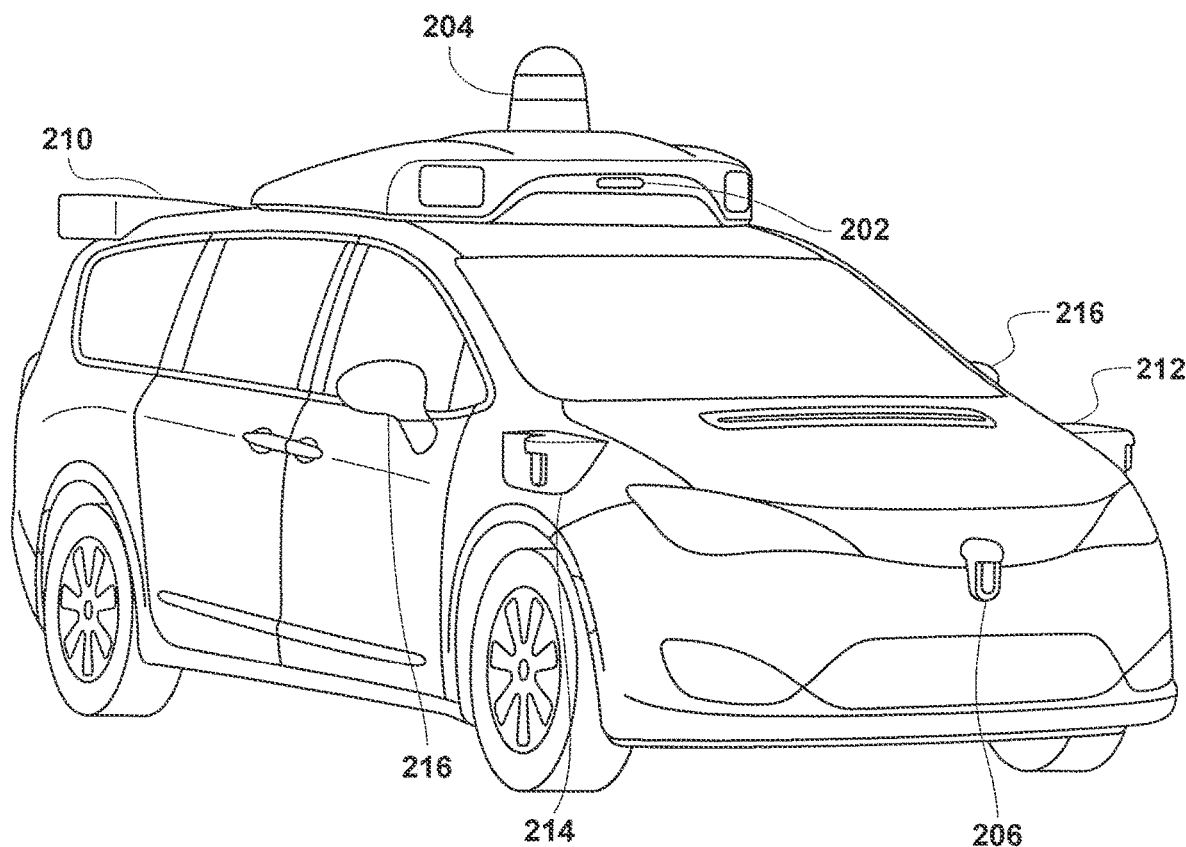
FIG. 2E is an illustration of a physical configuration of a vehicle, according to an example embodiment.

Example methods and apparatus are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments may include more or less of each element shown in a particular figure. Further, some of the illustrated elements may be combined or omitted. Yet further, an example embodiment may include elements that are not illustrated in the figures.

A vehicle, such as an autonomous or driverless vehicle, may navigate a path of travel without requiring a driver to provide guidance and control. To enable safe, autonomous navigation, the vehicle may utilize data about the local environment acquired from sensors of the vehicle. The vehicle may include one or more computing devices configured to process information about the environment received from the vehicle sensors. The one or more computing devices may provide information and/or instructions to the systems of the vehicle to perform a navigation strategy as the vehicle travels through the environment.

Example apparatus and methods disclosed herein perform sensor calibration without the need to use the ground-truth calibration targets. For example, vehicles that have been recently calibrated using ground-truth calibration targets (e.g., less than a threshold amount of time has passed since the vehicle's sensors were calibrated using ground-truth calibration targets) may be presumed to be properly calibrated. As such, these vehicles may accurately capture, using their sensors, objects within the environment (e.g., the reflectivity or precise location of objects within the environment from different vantage points). Further, based on the properties of the objects, recently calibrated vehicles may identify candidate objects within the environment that may be used as proxy calibration targets for calibrating sensors of other vehicles (e.g., used in place of ground-truth calibration targets for calibrating vehicles requiring check-up calibrations). In some embodiments, for example, a recently calibrated vehicle may identify or select Lambertian or nearly Lambertian objects for use as proxy calibration targets.

Upon identifying a candidate object that may be used as a proxy calibration target, the recently calibrated vehicle may upload information, including tags and/or metadata, about the candidate object (e.g., geographic location, reflectivity, size, shape, color, etc.) to a remote device (e.g., a remote/proxy server) that can disseminate the information about the candidate object for use as a proxy calibration target in calibrating sensors of other vehicles in the fleet. The information associated with the candidate object may be stored within the server and may be accessible by the other vehicles.

The other vehicles in the fleet (e.g., those vehicles requiring check-up calibration) may then obtain and use the information associated with the candidate object to perform check-up calibrations. In alternative embodiments, rather than uploading the information associated with the candidate object to a remote device (e.g., a remote/proxy server), the recently calibrated vehicle may transmit information about the candidate object directly to other vehicles in the fleet so that such vehicles may use the candidate object as a proxy calibration target to perform calibrations. Vehicles in the fleet that require check-up calibrations (e.g., due to a specified amount of run-time elapsing since a last calibration or because of an error detected in run-time) may determine the location of the candidate object and may navigate to the location to capture information about the object for sensor calibrations. The proxy calibration target may be a calibration target for all types of sensors (e.g., cameras, lidar devices, radar devices, etc.), while others may only be calibration targets for a subset of sensors (e.g., only usable to calibrate lidar devices).

The information associated with the candidate object for use as a proxy calibration target may include reflectivity information, location information (e.g., global positioning system (GPS) coordinates), color information, and/or a time tag indicating when the candidate object for use as a proxy calibration target was characterized or captured by a recently calibrated vehicle. The time tag may be used to determine when the information about the candidate object may become stale/unreliable and the candidate object should no longer be used as a proxy calibration target (e.g., at least until the information about the target is revalidated by another recently calibrated vehicle). For example, after a predetermined duration or after rain, snow, or other weather conditions, the surface of the candidate object for use as a proxy calibration target may have been altered such that its reflectivity may have changed and may no longer represent the condition of the candidate object that was previously captured by the recently calibrated vehicle. As a result, the candidate object may no longer be usable as a proxy calibration target.

Further, the candidate object may only be observable from a distinct number of perspectives within the environment. As such, the information associated with the candidate object (e.g., one of the tags) for use as a proxy calibration target may inform the vehicles in the fleet of a geo-fenced area relative to the candidate object. When a vehicle requiring check-up calibration is within the geo-fenced area, the vehicle may attempt to capture the candidate object in the environment using the sensors of the vehicle. Otherwise, the vehicle may forgo attempting to capture the candidate object for use as a proxy calibration target. In addition, within the geo-fenced area, there may only be some orientations (e.g., yaw orientations) from which the candidate object is observable using the sensors of the vehicle. Such orientations may be included in the information provided by the recently calibrated vehicle to the remote device (e.g., a proxy/remote server). Alternatively, such orientations may be determined by the server and/or by the recently calibrated vehicle offline (i.e., when the recently calibrated vehicle is not in transit).

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

The following description and accompanying drawings will elucidate features of various example embodiments. The embodiments provided are by way of example, and are not intended to be limiting. As such, the dimensions of the drawings are not necessarily to scale.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations. Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
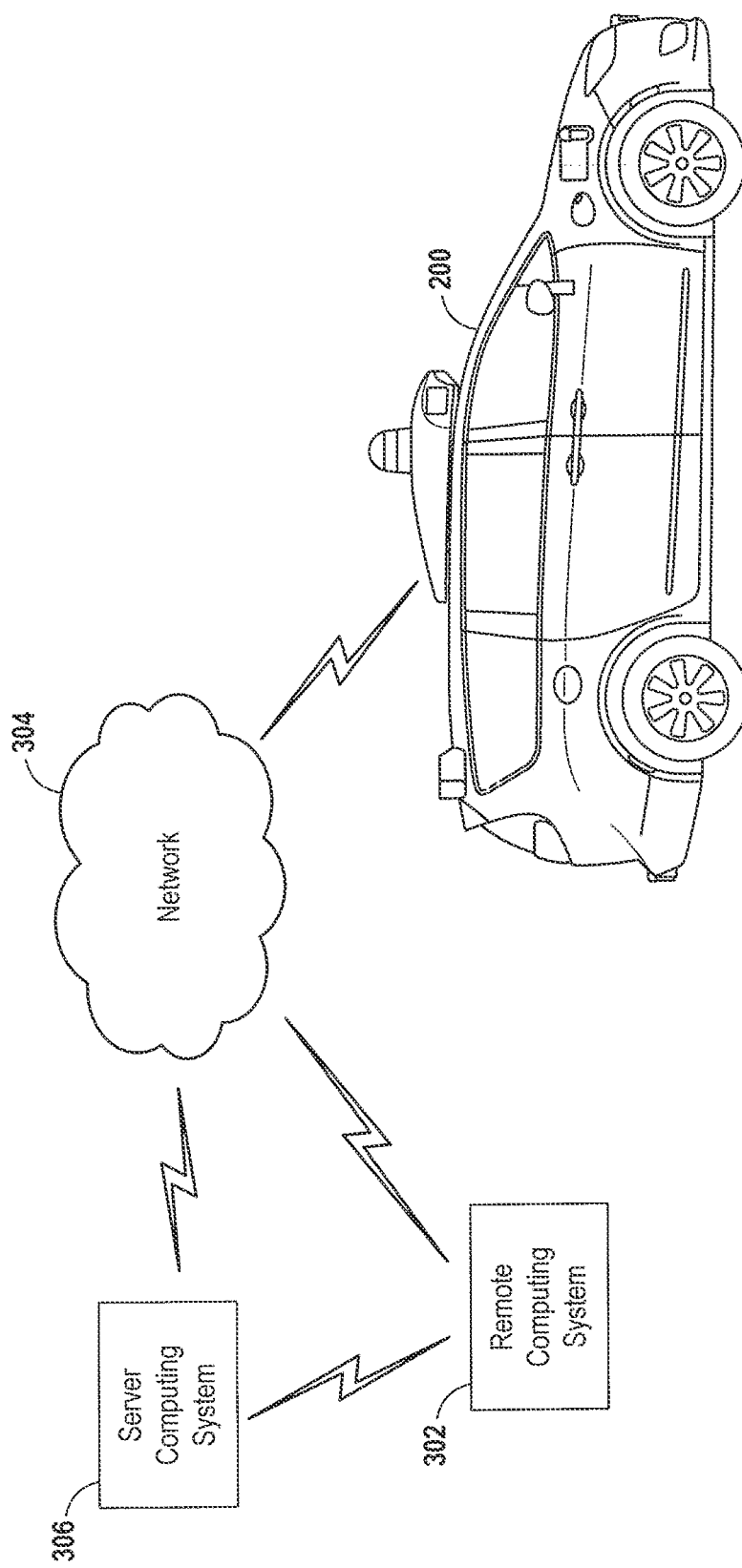
FIG. 3 is a conceptual illustration of wireless communication between various computing systems related to an autonomous vehicle, according to an example embodiment.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between the server computing system 306 and remote computing system 302, and between the server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
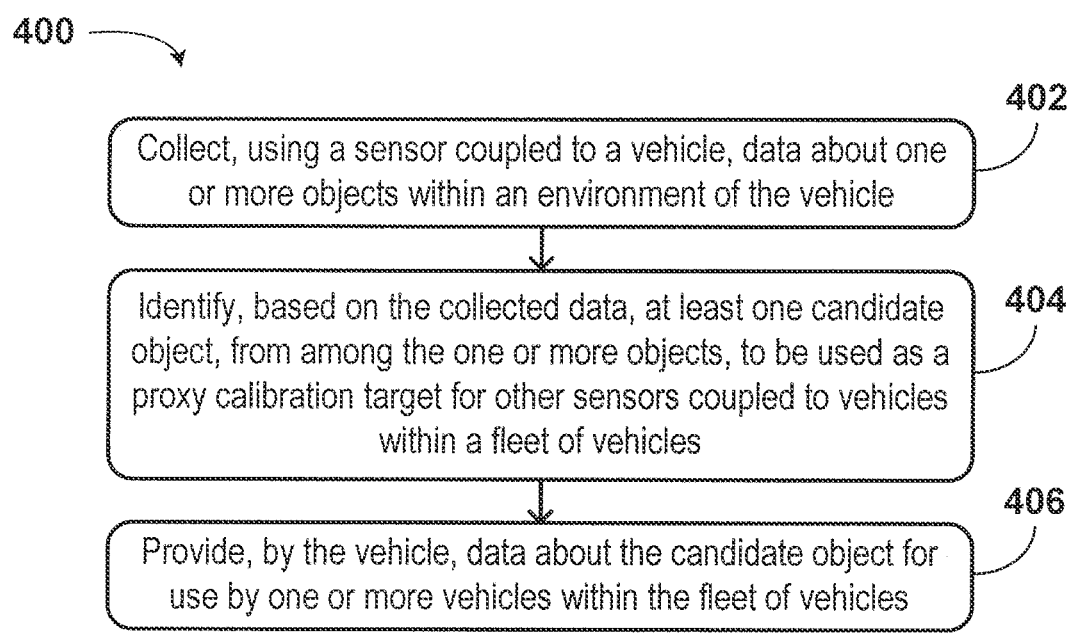
FIG. 4 is a flow chart of a method, according to an example embodiment.

FIG. 4 is a flowchart of a method 400, according to an example embodiment. The method 400 shown in FIG. 4 presents an embodiment of a method that may be used with any vehicle, such as the vehicles 100 and 200, as illustrated and described in reference to FIGS. 1-3, and/or the systems or components of the vehicles. For example, the processes described herein may be carried out by the radar unit 126, the lidar unit 128, other range-based sensors, or camera 130 mounted to an autonomous vehicle (e.g., vehicle 100 or 200) in communication with the computer system 112, the sensor fusion algorithm 138, and/or the computer vision system 140.

The method 400 may include one or more operations, functions, or actions as illustrated by one or more of blocks 402-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally or alternatively, for the method 400 and other processes and methods disclosed herein, one or more blocks in the flowchart may represent circuitry that is wired to perform the specific logical functions in the process.

In some examples, for the method 400 and other processes and methods disclosed herein, the functions described in the flowchart may be performed by a single vehicle (e.g., vehicle 100 or 200), distributed between multiple vehicles, performed by a remote server/external computing and/or performed by a combination of one or more external computing systems and one or more vehicles, among other possibilities.

At block 400, the method 400 may include collecting, using a sensor coupled to a vehicle, data about one or more objects within an environment of the vehicle. A vehicle may include one or more sensors configured to collect data or information (e.g., sensor data) from the environment surrounding the vehicle. For example, a vehicle may utilize various types of sensors to capture and acquire information within the environment of the vehicle. The sensors may be configured to provide different forms or types of information relating to the environment. In particular, the vehicle may use a sensor system to detect and collect information about objects in the environment surrounding the vehicle. The sensors of the sensor system may be calibrated using a ground-truth calibration target.

In one embodiment, a vehicle may be equipped with cameras to capture and collect a variety of information about objects in the environment surrounding the vehicle. For example, the cameras may capture images or a series of images of the objects in the environment (e.g., buildings, walls, features, traffic signals, road signs, landmarks, stationary objects, validation or calibration targets, etc.). The cameras may be attached to different positions of the vehicle to capture images from different points or orientations relative to the vehicle. The cameras may be connected in a network and may be linked to other cameras or systems of the vehicle through wired or wireless connections. A computing device of the vehicle may receive images or video from the cameras in real-time. The computing device may process the images to obtain information relating to the objects in the environment as further described below.

A vehicle may also be configured to capture and collect information about the environment surrounding the vehicle using a lidar unit, such as the lidar unit 204 as shown in FIG. 2. For example, the lidar unit may provide information to a computing device of a vehicle indicative of distances between the vehicle and other objects in the environment by illuminating objects with lasers and analyzing the reflected light. The lidar unit may use ultraviolet, visible, or near infrared light to detect objects within the environment of the vehicle. Upon receiving information from a lidar unit, the computing device of the vehicle may generate a 3D point cloud of the environment, which may include information indicative of distances between the vehicle and various objects within the environment, such as other vehicles, buildings, signs, trees, lane markers, or other objects. The 3D point cloud may also include information indicative of size, speed, and/or location of the objects in the environment surrounding the vehicle.

Further, a vehicle may be configured to capture and collect information about the environment using a radar unit. For example, a radar unit may enable the detection of objects within the environment of the vehicle through the use of transmitting and receiving radio waves. In particular, the radar unit may provide a computing device of a vehicle with information indicative of ranges, altitudes, directions of travel, and speeds of objects within the environment. For example, the reflected radio waves received by a radar system may identify the location and/or speed of nearby vehicles or objects (e.g., other vehicles, buildings, signs, trees, lane markers, or other objects). Other information may be provided through the use of radar and lidar units as well.

In addition, a vehicle may also be configured to capture and collect information regarding the position of the vehicle or other objects relative to a global coordinate system using a global positioning system (GPS). The GPS may be utilized to provide, to a computing device of a vehicle, information indicative of a position of the vehicle relative to intersections, roads, buildings, or other points of interest within the environment. The GPS may be utilized to provide information about nearby objects as well.

In one implementation, a vehicle may utilize one or more sensors (e.g., a camera, a lidar unit, a radar unit, and/or a GPS) to capture and collect information about a region or area within the environment of the vehicle. For example, the sensors of the vehicle may capture and acquire information associated with the objects in the environment, such as walls, buildings, calibration targets, validation targets, or other features of the environment while the vehicle is stationary or navigating through the environment. The vehicle may be configured to acquire the information associated with objects on a regular basis (e.g., daily, weekly, etc.). Prior to capturing the information about objects in the environment, the sensors of the vehicle may have been calibrated using a ground-truth calibration target within a predetermined time period.

At block 404, the method 400 may include identifying, based on the collected data, at least one candidate object, from among the one or more objects, to be used as a proxy calibration target for other sensors coupled to vehicles within a fleet of vehicles. As described above, the vehicle may be configured to capture and collect data or information (e.g., sensor data) from the environment surrounding the vehicle using one or more sensors (e.g., a lidar unit, a radar unit, a camera, etc.). The one or more sensors of the vehicle may be calibrated using a ground-truth calibration target prior to capturing information about the environment.

The vehicle may include a computing device configured to receive the information (e.g., sensor data) about the environment from the one or more sensors and to evaluate the information to detect objects in the environment. In particular, the computing device of the vehicle may be configured to identify one or more candidate objects from the detected objects in the environment for use as a proxy calibration target based on the characteristics of the objects as further described below. In one implementation, the computing device of the vehicle may receive information about one or more objects captured by a sensor of another vehicle within a fleet of vehicles.

The computing device of the vehicle may be configured to generate or build a three-dimensional (3D) representation of the environment based on the information (e.g., sensor data) from the sensors of the vehicle, which may indicate various measurements and distances between the vehicle, objects, and other elements within the environment. In particular, the data points within a 3D representation may be organized within a 3D coordinate system, which may be defined by x, y, and z coordinates. In some instances, the data points may represent other dimensions, such as two-dimensions or one-dimension. The 3D representation may be generated by the computing device as a 3D point cloud representing a large number of data points on the surface of one or more objects detected in the environment.

The computing device of the vehicle may use an object-detection algorithm/module or other computing process to analyze the 3D point cloud (as data points or as determined 3D surfaces) to perceive features in the environment for identifying objects present in the point cloud. To determine whether an object is present in the 3D point cloud, the object-detection software and/or module may analyze the 3D point cloud to detect and recognize objects in the environment captured by the sensors. For example, the computing device of the vehicle may associate arrangements of the data points of the point cloud with patterns matching objects, environmental features, and/or categories of objects or features. Objects represented by the point cloud may be, for example, a vehicle (e.g., a car), a building, a wall, an obstacle (e.g., a tree), a pedestrian, a road sign, a traffic light, or other objects or elements.

Once an object is detected from the data points of the point cloud, the computing device of the vehicle may determine a variety of information corresponding to the detected object. For example, the computing device can analyze the data points within the 3D point cloud to detect distinctive characteristics, parameters, and/or features associated with the object within the environment. The characteristics, parameters, and/or features of the objects may include, but are not limited to, reflective light intensity, location, position, orientation, distance, height, size, color, material, texture and/or other characteristics or parameters. For example, the computing device may be configured to determine range information, such as distances corresponding to the objects within the environment relative to the vehicle, based on the point cloud data. Similarly, the computing device may also determine the relative distances between objects within the environment or other parameters relating to distances. In some examples, the computing device may identify a target with known reflectivity (e.g., calibration and/or validation targets). Further, the computing device may analyze the range data to determine intensity information about the objects within the environment. In some instances, a number of data points of the range information may vary, which may be due to the complexity or materials of the objects within the environment.

The computing device of the vehicle may also be configured to determine the locations of the objects in the environment surrounding the vehicle based on the point cloud data. For example, the computing device may determine the locations of objects using different coordinate systems relative to the position of the vehicle according to information provided by the GPS or other sensors. In addition, the computing device of the vehicle may be configured to use images captured from a camera for pose estimation of the objects in the environment. For example, the computing device may utilize various images to determine the position or orientation of specific objects in the environment relative to the vehicle.

Further, the computing device of the vehicle may be configured to determine a particular time of day (e.g., morning, afternoon, or evening) that the data points of the point cloud were captured. For example, each data point of the point cloud may be associated with a timestamp. The computing device may also determine one or more environmental conditions (e.g., angle of the sun, temperature, humidity, wind speed, visibility/fog presence, background noise levels, etc.) occurring at the time of capturing the data points of the point cloud. The environmental conditions may impact the resolution, signal quality, and/or other scanning characteristics of the one or more sensors of the vehicle.

After the objects have been detected and/or recognized based on the data points of the 3D point cloud, the computing device of the vehicle can identify or classify the objects as candidate objects for use as a proxy calibration target for calibrating sensors of other vehicles. For example, the information associated with the objects can be analyzed and/or evaluated using various criteria to determine one or more features or parameters (e.g., quality metrics) associated with the object, such as a reflectivity information, location information, color information, time of day, angle of the sun, a date or time tag, a level of contrast, a level of saturation, and/or a level of blur of the candidate object. If a quality of one or more of the features or parameters associated with an object satisfies or meets a quality criterion or a particular threshold, the computing device may classify or identify one or more objects as candidate objects for use as proxy calibration targets for calibrating sensors of other vehicles as further described below. In some embodiments, for example, a recently calibrated vehicle may identify or select Lambertian or nearly Lambertian objects for use as proxy calibration targets. Further, the computing device may identify calibration or validation targets with known reflectivity. Thus, the computing device of the vehicle may be configured to identify one or more candidate objects from the objects in the environment for use as a proxy calibration target based on the characteristics of the one or more candidate objects.

At block 406, the method 400 includes providing, by the vehicle, data about the proxy calibration target for use by one or more vehicles within the fleet of vehicles. Once a computing device of a vehicle has identified one or more candidate objects (e.g., stationary objects, walls, buildings, landmarks, geographic features, calibration or validation targets, etc.) from the detected objects in the environment, the vehicle may be configured to send or provide the information associated with the one or more candidate objects to a remote device (e.g., a remote/proxy server or another vehicle in the fleet). The one or more candidate objects may be used as proxy calibration targets for calibrating sensors of other vehicles in the fleet. In some examples, calibration and/or validation targets may be validated by other vehicles in the fleet.

The information associated with the candidate object may include one or more scans of the one or more candidate objects in the environment by one or more sensors of the vehicle or another vehicle within a fleet of vehicles. The information may also include the characteristics of the one or more candidate objects (e.g., reflective light intensity, location, position, orientation, distance, height, size, shape, color, material, texture and/or other characteristics or parameters etc.). Further, the information associated with the candidate object may also include a time tag indicating when the candidate object was characterized or captured by a vehicle. The time tag may be used to determine when the information about the candidate object may become stale/unreliable and the candidate object should no longer be used as a proxy calibration target (e.g., at least until the information about the target is revalidated by another recently calibrated vehicle). For example, after a predetermined duration or after rain, snow, or other weather conditions, the surface of the candidate object for use as a proxy calibration target may have been altered such that its reflectivity may have changed and may no longer accurately represent the condition of the candidate object that was previously captured by the recently calibrated vehicle. As a result, the candidate object may no longer be usable as a proxy calibration target.

Further, the information associated with the candidate object (e.g., one of the tags) for use as a proxy calibration target may provide a geo-fenced area relative to the candidate object. When a vehicle requiring check-up calibration is within the geo-fenced area, the vehicle may attempt to capture the candidate object in the environment using the sensors of the vehicle. The information associated with the candidate object may also include orientations (e.g., yaw orientations) from which the candidate object is observable using the sensors of the vehicle. The orientations may be determined by the recently calibrated vehicle or the remote device (e.g., remote/proxy server).

The remote device (e.g., a remote/proxy server) may be configured to receive the information associated with the one or more candidate objects from the vehicle. The remote device may then send or provide the information associated with one or more candidate objects to another or second vehicle for use as proxy calibration targets. Alternatively, the other or second vehicle may receive the information associated with the one or more calibration objects directly from the vehicle.

Once the other or second vehicle may receive the information associated with one or more candidate objects for use as a proxy calibration target, the other vehicle may use the one or more candidate objects for calibrating, aligning, repairing, testing, validating, and/or verifying the performance of one or more sensors of the other vehicle. For example, the information associated with the one or more candidate objects may include the location of the one or more candidate objects. The other vehicle may use the location of the one or more candidate objects to navigate near or within a threshold distance from the location of the one or more candidate objects. When the other vehicle determines (e.g., using GPS, etc.) that it is within a suitable range or distance to the one or more candidate objects, the other vehicle may cause one or more of its sensors to capture and collect information associated with the one or more the candidate objects in the environment. In some instances, the threshold distance may be based on a scanning range configuration of a sensor of the other vehicle.

Figure 7:
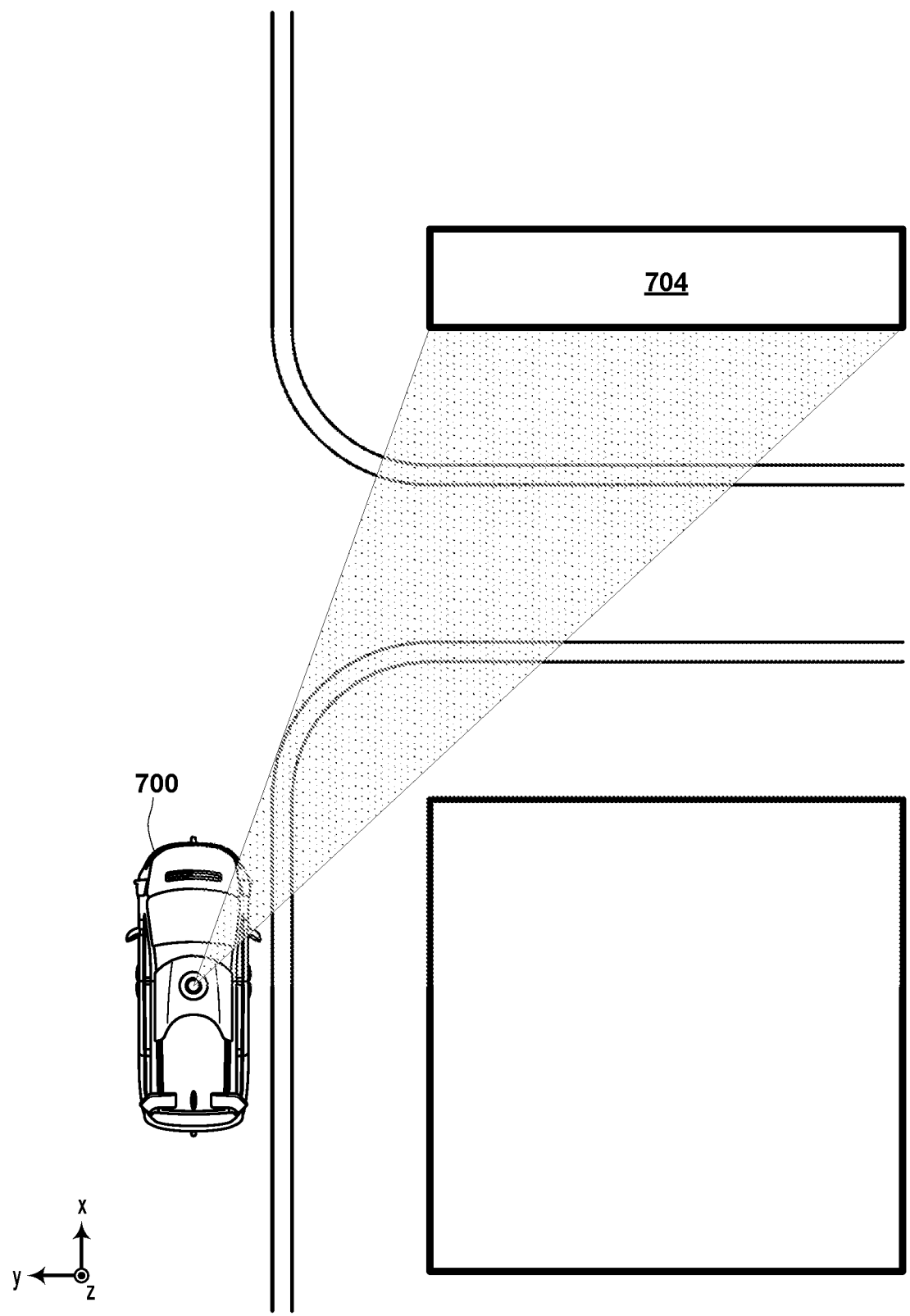
FIG. 7 is a conceptual illustration of an autonomous vehicle capturing information about an object in an environment, according to an example embodiment.
Figure 8:
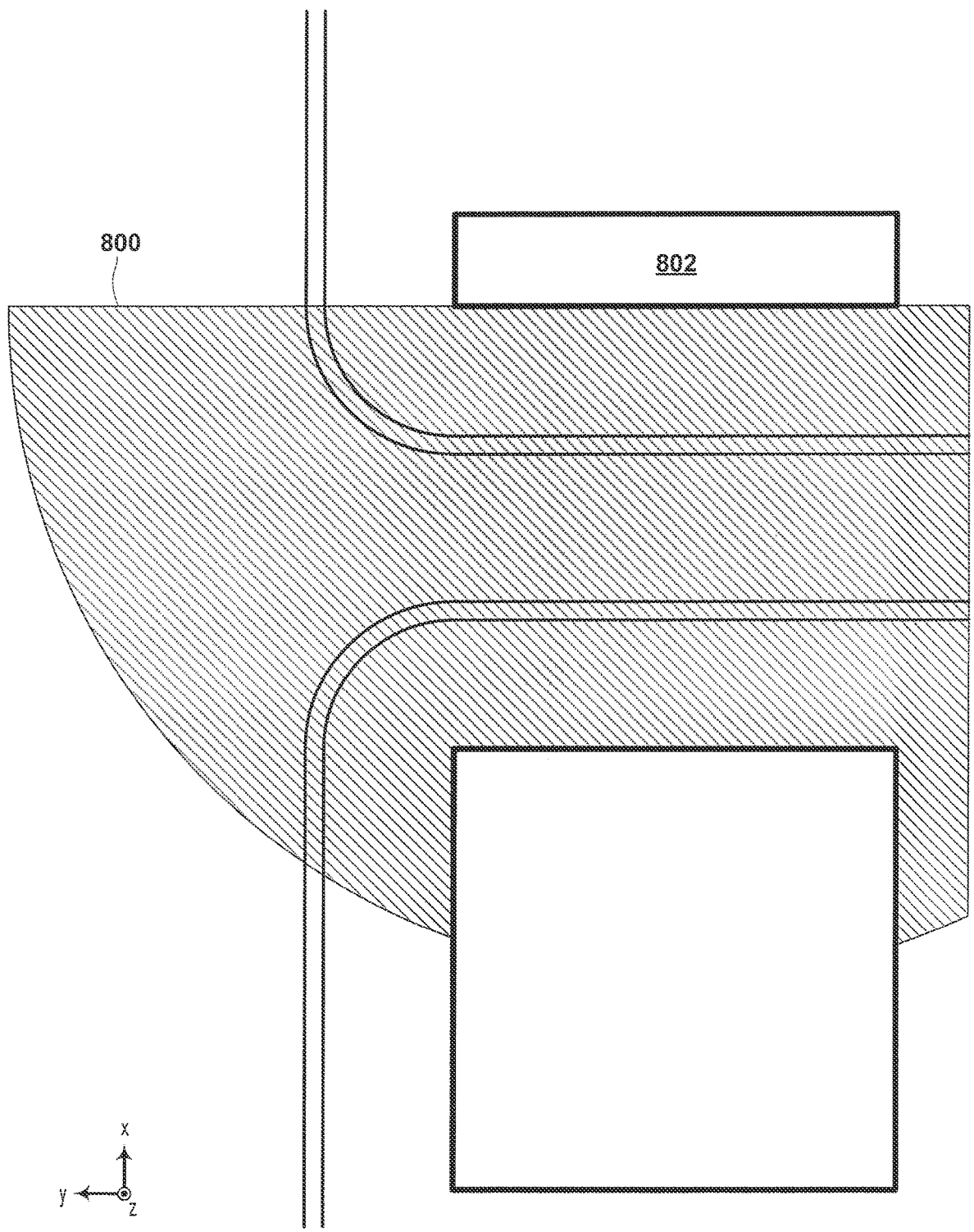
FIG. 8 is a conceptual illustration of an environment having a geo-fenced area relative to an object, according to an example embodiment.

The other vehicle may also be configured to adjust the viewing direction of one of its sensors (e.g., a lidar unit) toward a field of view (FOV) that includes the one or more candidate objects. For example, as shown in FIG. 7, a vehicle 700 may adjust its FOV to capture and collect information about an object 702 in the environment. Further, the one or more candidate objects may only be observable from a distinct number of perspectives within the environment. As such, the information associated with the one or more candidate objects (e.g., one of the tags) may inform the vehicles in the fleet the location of a geo-fenced area relative to the proxy calibration target. For example, as shown in FIG. 8, a geo-fenced area 800 may be identified for capturing information about the object 802 in the environment. When vehicles requiring check-up calibration are within the geo-fenced area, the vehicles may capture information about the candidate object in the environment for use in calibration sensors.

After the other vehicle captures the information associated with the one or more candidate objects in the environment using the sensors of the vehicle, the computing device of the other vehicle may then compare the information associated with the one or more candidate objects received from the remote device (i.e., a remote server or another vehicle in the fleet) to the information associated with the one or more candidate objects captured by the other vehicle. The other vehicle can then use the comparison for calibrating, aligning, repairing, testing, validating, and/or verifying the performance of one or more of its sensors as further described below. In some examples, the other vehicle may validate objects, such as calibration and/or validation targets with known reflectivity.

Figure 5:
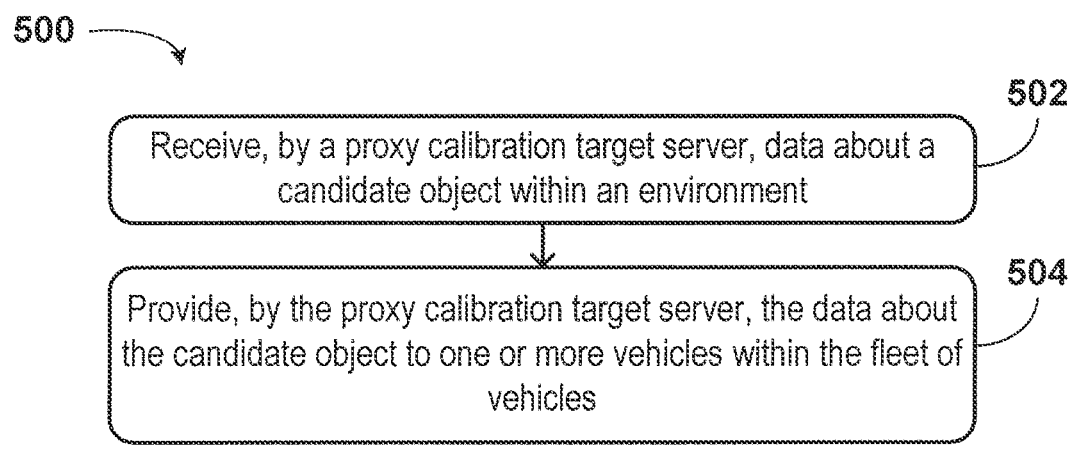
FIG. 5 is a flow chart of a method, according to an example embodiment.

FIG. 5 is a flowchart of a method 500, according to an example embodiment. The method 500 shown in FIG. 5 presents an embodiment of a method that may be used with any vehicle, such as the vehicles 100 and 200, as illustrated and described in reference to FIGS. 1-3, and/or the systems or components of the vehicles. The method 500 may include one or more operations, functions, or actions as illustrated by one or more of blocks 502-504. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the method 500 includes receiving, by a proxy calibration target server, data about a candidate object within an environment. As described above, a vehicle may identify one or more candidate objects from the objects detected in the environment. The one or more candidate objects may be usable by a fleet of vehicles as a proxy calibration target for performing sensor calibrations. For example, once a vehicle has identified one or more candidate objects (e.g., stationary objects, buildings, landmarks, geographic features, calibration or validation targets, etc.) for use as proxy calibration targets, the vehicle may send the information associated with the candidate object to a remote device (e.g., a proxy calibration target server).

The remote device may receive and store the information associated with the one or more candidate objects received from the vehicle. The information may include one or more scans of the one or more candidate objects detected in the environment by one or more sensors of the vehicle or another vehicle within the fleet of vehicles. The information may also include the characteristics of the one or more candidate objects (e.g., reflective light intensity, location, position, orientation, distance, height, size, shape, color, material, texture and/or other characteristics or parameters, etc.) as described above.

At block 504, the method 500 provides, by the proxy calibration target server, the data about the candidate object to one or more vehicles within the fleet of vehicles. A remote device (e.g., a proxy calibration target server) may store information associated with one or more candidate objects identified for use as proxy calibration targets. Upon receiving a calibration message from a vehicle, the remote device may be configured to send or provide the information associated with the one or more candidate objects to the vehicle for use as proxy calibration targets. The information may include one or more scans of the one or more candidate objects of the detected objects in the environment (e.g., stationary object, building, landmark, geographic feature, etc.) by one or more sensors of the vehicle. The information may also include the characteristics associated with the one or more candidate objects (e.g., reflective light intensity, location, position, orientation, distance, height, size, shape, color, material, texture and/or other characteristics or parameters, etc.).

Once the vehicle receives the information associated with the one or more candidate objects for use as a proxy calibration target, the vehicle may use the proxy calibration target for calibrating, aligning, repairing, testing, validating, and/or verifying the performance of one or more sensors of the vehicle. For example, the vehicle may obtain the location of the one or more candidate objects and navigate the vehicle near the location of the one or more candidate objects. When the vehicle determines (e.g., using GPS, etc.) that it is within a suitable range or distance to the one or more candidate objects, the vehicle may cause one or more of its sensors to capture and collect information associated with the one or more the candidate objects in the environment.

After the vehicle captures the information associated with the one or more candidate objects in the environment, the computing device of the vehicle may then compare the proxy calibration targets received from the remote device (i.e., a remote server or another vehicle in the fleet) to the one or more candidate objects captured by the sensors of the vehicle. The vehicle can then use the comparison for calibrating, aligning, repairing, testing, validating, and/or verifying the performance of one or more sensors of the vehicle as further described below.

Figure 6:
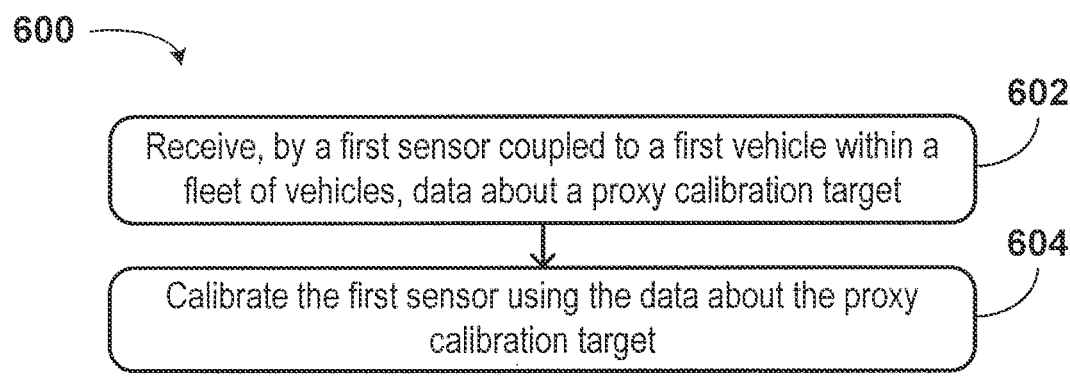
FIG. 6 is a flow chart of a method, according to an example embodiment.

FIG. 6 is a flowchart of a method 600, according to an example embodiment. The method 600 shown in FIG. 6 presents an embodiment of a method that could be used with any vehicle, such as the vehicles 100 and 200, as illustrated and described in reference to FIGS. 1-3, and/or the systems or components of the vehicles. The method 600 may include one or more operations, functions, or actions as illustrated by one or more of blocks 602-604. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, the method 600 may include receiving, by a first vehicle within a fleet of vehicles, data about a proxy calibration target. A remote device (e.g., a proxy/remote server or another vehicle in the fleet) may be configured to store information associated with one or more candidate objects for use as proxy calibration targets in connection with calibration of the sensors of the vehicle. The information associated with the one or more candidate objects may have been captured by one or more sensors of a vehicle within a particular time period and identified as a candidate object for use as a proxy calibration target. The sensors of the vehicle may have been calibrated using a ground-truth calibration target.

A vehicle may determine that one or more sensors of the vehicle may require calibration and request a proxy calibration target from the remote device. For example, a computing device of the vehicle may request a proxy calibration target from a remote device based on a determination that a predetermined amount of time has passed since one or more sensors have been calibrated. In another example, the computing device may request a proxy calibration target from the remote device based on a determination of a defect in a scanning characteristic of a sensor, such as a change in the scanning range, error tolerance, or other scanning characteristic of the sensor. The computing device may also request a proxy calibration target from a remote device based on a determination that the location of the objects identified in the environment do not exactly match the locations given in map data. Further, computing device may request a proxy calibration target from a remote device based on a sensor that exhibits unexpected or different scanning characteristics in a scan of the target as compared to one or more other scans of the target (e.g., by the same sensor at a different time, or by one or more other sensors at the same time or at different times).

In response to a determination that one or more sensors of the vehicle may need calibration, the vehicle may transmit (e.g., via a communication system) a calibration message to the remote device (e.g., a proxy/remote server or another vehicle in the fleet). The calibration message may request the remote device to send a proxy calibration target to the vehicle. After the remote device receives the calibration message, the remote device may send and the vehicle may receive the information associated with the one or more candidate objects for use as a proxy calibration target.

The proxy calibration target may correspond to one or more candidate objects (e.g., stationary objects, walls, buildings, features, etc.) in the environment. The proxy calibration target may also include information indicative of one or more characteristics of the proxy calibration target (e.g., color, material, shape, etc.). For example, the information may include a location of the proxy calibration target in the environment. Further, the information may include a list of the proxy calibration targets and locations.

At block 604, the method 600 may include calibrating the first sensor using the information or data about a proxy calibration target. A vehicle may receive a proxy calibration target from a remote device (e.g., a remote server) and use the received proxy calibration target for calibrating, aligning, repairing, testing, validating, and/or verifying the performance of one or more sensors of the vehicle. For example, the vehicle may determine a location of a candidate object in the environment that is associated with the proxy calibration target based on the information received from the remote device. The vehicle may navigate near the candidate object and capture and collect information associated with the candidate object using one or more sensors as described above.

After the vehicle captures the information associated with the candidate object, a computing device of the vehicle may then compare the information associated with the candidate object captured by the vehicle to the information associated with the proxy calibration target received from the remote device (e.g., a proxy/remote server). The vehicle can then use the comparison for calibrating, aligning, repairing, testing, validating, and/or verifying the performance of one or more sensors of the vehicle.

In one implementation, the computing device of the vehicle may use the comparison to determine if a sensor is providing inaccurate information. For example, if the comparison the information of the candidate object (e.g., characteristics) provided by the sensors of the vehicle to the information of the proxy calibration target provided by the remote device differ by at least a threshold amount, then the vehicle may identify the sensor of the vehicle for calibration or further testing, prevent the vehicle from using the sensor for subsequent scans of the environment, update the calibration information (e.g., calibration coefficients) used to interpret sensor data from the sensor, associate sensor measurements from the sensor with various environmental conditions (e.g., light conditions, weather conditions, temperature, background noise level, time of day, etc.), and/or align the sensor with other sensors in the vehicle, among other possibilities. The vehicle may also be configured to determine that the difference is due to a change in the target itself (e.g., the target was moved or damaged) or due to a change in a condition of the environment that affects lidar measurements (e.g., heavy rain, fog, etc.), rather than due to the calibration of the vehicle.

When a sensor is not properly calibrated, the computing device of the vehicle may provide instructions, based on the comparison, to adjust one or more parameters associated with a sensor, such as adjusting the intensity and the orientation of the sensor, in order to calibrate the sensors. For example, the computing device of the vehicle may adjust the intensity of a lidar unit. The computing device may also provide instructions to adjust a direction-of-focus of the sensor based on the comparison. For example, the vehicle may adjust the direction of focus of the radar unit or cameras of the vehicle. Further, the vehicle may adjust calibration parameters for modifying image pixel data received from the camera or for modifying exposure times or other operation parameters of the camera to account for a change in a scanning characteristic (e.g., color data) of a camera sensor.

Since sensors of a vehicle may require calibration periodically to maintain accuracy and proper function, the methods and apparatus described above can be repeated at various times when the vehicle travels near a proxy calibration target to ensure continued adherence of the sensors with particular specifications and/or particular error tolerances. The vehicles may utilize objects that appear in the environment of the vehicles to calibrate sensors rather than designated targets designed for calibration purposes. For instance, the vehicle may be configured to calibrate various sensors by comparing a proxy calibration target corresponding to an object in the environment received from a remote device with information captured about the object by the sensors of the vehicle.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    collecting, using a sensor coupled to a vehicle, data about one or more objects within an environment of the vehicle;
    identifying, based on the collected data, at least one candidate object from among the one or more objects, to be used as a proxy calibration target for other sensors coupled to vehicles within a fleet of vehicles; and
    providing, by the vehicle, data about the candidate object for use by one or more vehicles within the fleet of vehicles.

2. The method of claim 1, wherein providing, by the vehicle, data about the candidate object for use by one or more vehicles within the fleet of vehicles comprises:
    transmitting, by the vehicle, the data about the candidate object to a server.

3. The method of claim 1, wherein providing, by the vehicle, data about the candidate object for use by one or more vehicles within the fleet of vehicles comprises transmitting, by the vehicle, the data about the candidate object to at least one vehicle within the fleet of vehicles.

4. The method of claim 1, wherein the sensor was calibrated prior to collecting data about the one or more objects within the environment of the vehicle.

5. The method of claim 4, further comprising:
    determining a time difference between a time at which the sensor was calibrated and a current time;
    comparing the time difference to a threshold; and
    determining, based on the comparison, that the sensor is usable to identify candidate objects to be used as proxy calibration targets.

6. The method of claim 1, wherein the sensor comprises a light detection and ranging (LIDAR) sensor, a radar sensor, or a camera.

7. The method of claim 1, wherein the vehicle is configured to operate in an autonomous mode, and wherein the fleet of vehicles comprises vehicles configured to operate in the autonomous mode.

8. A system comprising:
    a sensor configured to collect data about one or more objects within an environment of a vehicle; and
    one or more computing devices configured to:
        identify, based on the collected data, at least one candidate object from the one or more objects to be used as a proxy calibration target; and
        provide data about the at least one candidate object for use by one or more vehicles within a fleet of vehicles.

9. The system of claim 8, wherein the one or more computing devices provide the data about the candidate object by transmitting the data to a server.

10. The system of claim 8, wherein the one or more computing devices provide the data about the candidate object by transmitting the data to at least one vehicle within the fleet of vehicles.

11. The system of claim 8, wherein the sensor was calibrated prior to collecting data about the one or more objects within the environment of the vehicle.

12. The system of claim 8, wherein the one or more computing devices are further configured to:
    determine a time difference between a time at which the sensor was calibrated and a current time;
    compare the time difference to a threshold; and
    determine, based on the comparison, that the sensor is usable to identify candidate objects to be used as proxy calibration targets.

13. The system of claim 8, wherein the sensor comprises a light detection and ranging (LIDAR) sensor, a radar sensor, or a camera.

14. The system of claim 8, wherein the vehicle is configured to operate in an autonomous mode, and wherein the fleet of vehicles comprises vehicles configured to operate in the autonomous mode.

15. The system of claim 8, wherein the one or more computing devices are further configured to:
    receive data about the one or more objects from another sensor coupled to another vehicle within the fleet of vehicles; and
    compare the received data to the collected data, wherein the at least one candidate object is identified based on the comparison.

16. A system comprising:
    a first sensor of a first vehicle within a fleet of vehicles, one or more computing devices configured to:
        receive data about a proxy calibration target collected by a second sensor of a second vehicle within the fleet of vehicles; and
        calibrate the first sensor using the data about the proxy calibration target.

17. The system of claim 16, wherein the data about the proxy calibration target comprises a boundary of a geographic area within which the proxy calibration target is observable.

18. The system of claim 17, wherein the one or more computing devices are further configured to alter a navigation route for the first vehicle, such that the altered navigation route passes through the boundary.

19. The system of claim 16, wherein the data about the proxy calibration target is received by the first vehicle from the second vehicle.

20. The system of claim 16, wherein the data about the proxy calibration target is received by the first vehicle from a server.

* * * * *